United States Patent [19]

Takizawa

[11] Patent Number: 4,640,579
[45] Date of Patent: Feb. 3, 1987

[54] SLIDING FRICTION MEMBER FOR LENS SLIDING RING

[75] Inventor: Morio Takizawa, Saitama, Japan

[73] Assignee: Asahi Kogaku Kogyo Kabushiki Kaisha, Tokyo, Japan

[21] Appl. No.: 578,349

[22] Filed: Feb. 9, 1984

[30] Foreign Application Priority Data

Feb. 10, 1983 [JP] Japan .................................. 58-18373
Mar. 2, 1983 [JP] Japan .................................. 58-30119

[51] Int. Cl.[4] .......................... G02B 15/00; G02B 7/04
[52] U.S. Cl. ...................................... 350/255; 350/429
[58] Field of Search ............... 350/247, 252, 253, 255, 350/429

[56] References Cited

U.S. PATENT DOCUMENTS

| | | | |
|---|---|---|---|
| 1,848,402 | 3/1932 | Wollensak | 350/255 |
| 2,908,209 | 10/1959 | Marvin et al. | 350/255 |
| 3,876,290 | 4/1975 | Back | 350/429 |
| 4,496,217 | 1/1985 | Aoyagi | 350/255 |

Primary Examiner—John K. Corbin
Assistant Examiner—Loha Ben
Attorney, Agent, or Firm—Sughrue, Mion, Zinn, Macpeak & Seas

[57] ABSTRACT

A photographing lens device having an improved sliding friction member which restrains sliding movement of a sliding ring such as a lens hood ring or a zooming ring with respect to the mating sleeve in which it is slidably received. The sliding friction member is formed of a corrugated elastic member which is bent into an annular shape and fitted into a receiving groove formed in the sliding ring. The inner surface of the elastic member may be flocked to prevent scratching.

8 Claims, 10 Drawing Figures

SLIDING FRICTION MEMBER FOR LENS SLIDING RING

BACKGROUND OF THE INVENTION

The present invention relates to an improved friction member for restraining sliding movement of a sliding ring such as a lens hood ring or a zooming ring in a photographing lens.

Heretofore, a sliding friction member made of woolen cloth or the like has been bonded to the inner wall of the sliding part of such a sliding ring to fix the sliding ring, to absorb shocks which may occur during sliding, and to prevent play in the sliding ring. The woolen cloth must be glued to the inner wall of a lens hood ring or the like, which is difficult to do in production. Also, the use of woolen cloth results in a relatively high material cost. In addition, such a woolen cloth member has a rather low wear resistance.

An improved sliding friction member of this type is disclosed in Japanese Utility Model Application Publication No. 16347/1978. In accordance with the technique therein disclosed, to restrain movement of the hood ring or the like, instead of woolen cloth, a plastic material is employed, with a metal member fitted to a sleeve-shaped plastic member. More particularly, a piano wire or the like is inserted into a sleeve of an elastic material having a high wear resistance, such as nylon, vinyl or Teflon (TM), and is formed into a polygonal ring having regularly arranged long and short sides. The ring thus formed is fitted into the receiving groove of the sliding part of the lens hood ring or the like while being urged radially inwardly. Since the elastic member is elastically urged inwardly, the long sides abut the outer wall of the inner cylinder, while the short sides are elastically urged to expand outwardly. As a result, the polygonal spring member abuts against the receiving groove cut in the inner wall of the inner cylinder, thereby maintaining the outer cylinder stable. The object is to provide a click stop function by utilizing a step or the like of the inner cylinder to restrain movement of the lens hood ring or the like.

However, this approach is disadvantageous in that, since the metal wire is inserted into the sleeve-shaped plastic material and it is formed into the polygonal ring having long and short sides regularly arranged as described above, the manufacture of the component is relatively difficult and high in cost.

In addition, as the elastic member presses against the outer wall of the inner cylinder, the painted outer wall of the inner cylinder may be scratched. This is another drawback of the conventional sliding friction member.

Accordingly, objects of the invention are to provide a sliding friction member for a lens sliding ring which will not scratch the coated surface of the sliding part and which allows a smooth sliding operation with suitable sliding friction and with proper depression force.

SUMMARY OF THE INVENTION

Overcoming the above-mentioned difficulties, the invention provides a sliding friction member which is a belt-shaped elastic plastic member which is corrugated to have convex and concave parts at equal intervals. This sliding friction member is fitted into a receiving groove formed in the inner wall of a lens hood ring or the like so that the latter can smoothly slide with a suitable sliding friction and under proper pressure.

DESCRIPTION OF THE PREFERRED EMBODIMENTS

Figure 1:
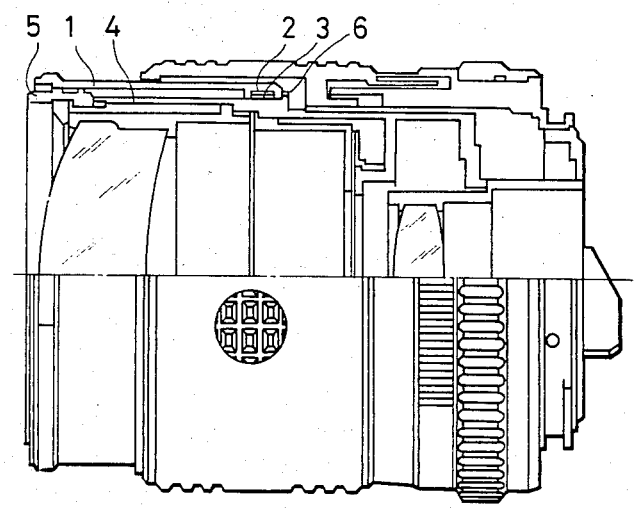
FIG. 1 is a side view, the upper half of which is in section, showing a first embodiment of a sliding friction member of the invention.
Figure 3:
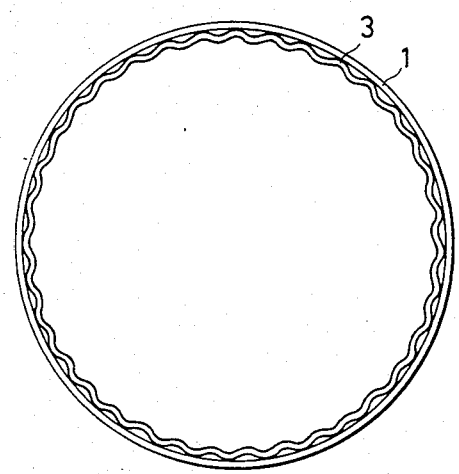
FIG. 3 is a sectional view, as viewed from the front of a lens hood ring, showing a plastic member according to the invention fitted into a lens hood ring.
Figure 4:
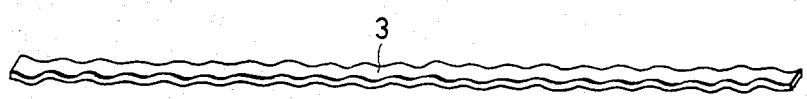
FIG. 4 is a perspective view of the plastic member.

A first preferred embodiment of the invention will be described with reference to FIG. 1 of the accompanying drawings. FIG. 1 is a side view, the upper half of which is in section, of a photographing lens, including a lens hood ring. A receiving annular groove 2 is cut in the inner surface of the rear part of the lens hood ring 1. A sliding friction member, namely, an elastic plastic member 3 is loosely fitted in the groove 2. The plastic member 3 is fabricated by corrugating a belt-shaped plate to form therein a wavy section. FIG. 3 is a sectional view showing the plastic member 3 fitted in the lens hood ring 1, and FIG. 4 is a perspective view of the plastic member 3. The plastic member 3 is fitted into the groove 2 in such a manner that the bottom of the groove is pushed radially outwardly by the plastic member. Thus, the plastic member 3 can be loosely fitted in the receiving groove 2 of the lens hood ring 1 without the use of an adhesive or the like.

After the plastic member 3 has been fitted into the groove 2, the lens hood ring 1 is fitted on the inner cylinder 4, which forms the front frame of the lens barrel. Then, a retaining ring 5 is installed so that the lens hood ring 1 cannot come off. That is, the lens hood ring 1 is fitted on the inner cylinder in such a manner that it is slidable between the retaining ring 5 and a rear protrusion 6 of the inner cylinder 4. The convex parts of the plastic member 3 abut against the bottom of the receiving groove 2 of the lens hood ring 1 and against the outer wall of the inner cylinder 4.

Figure 2:
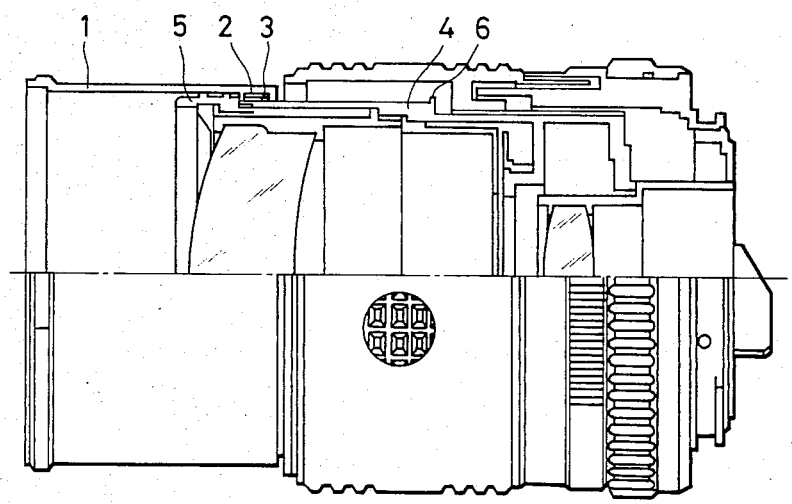
FIG. 2 is a side view, the upper half of which is in section, showing the lens hood ring in FIG. 1 in an extended position.

When the lens hood ring 1, which has been retracted as shown in FIG. 1, is slid so that it is extended as shown in FIG. 2, the gap between the lens hood ring 1 and the inner cylinder 4 is maintained unchanged, and the plastic member serves as a shock-absorbing friction member. Therefore, the lens hood ring can smoothly slide. Furthermore, even if the lens is held in a sloping position with the lens hood ring 1 extended, the lens hood ring 1 will not be displaced.

The corrugated plastic member 3 can be readily formed by inserting a plate-shaped plastic member between two engaged gears.

Figure 5:
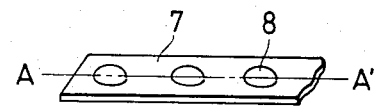
FIG. 5 is a perspective view showing a second embodiment of a sliding friction member of the invention.
Figure 6:
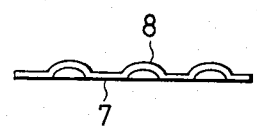
FIG. 6 is a cross-sectional view taken along a line A—A' in FIG. 5.
Figure 7:
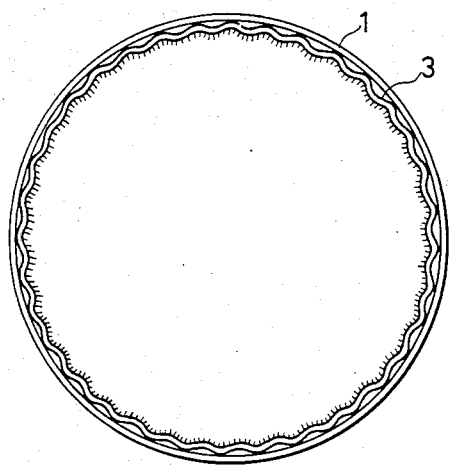
FIGS. 7 through 10 are views similar to those of FIGS. 3 through 6 showing third and fourth embodiments of the invention.
Figure 8:
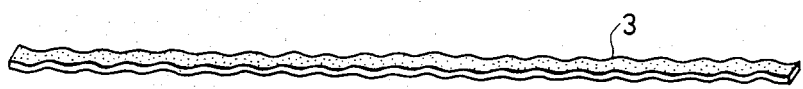
Figure 9:
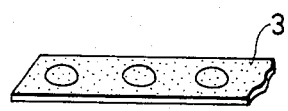
Figure 10:

FIG. 5 and FIG. 6 show another embodiment of the invention. In this embodiment, protrusions 8 are formed on a plate-shaped plastic member 7. The effect of the embodiment is the same as the first embodiment in which the plastic plate is corrugated.

The invention has been described with reference to the case where the sliding friction member is used for a lens hood ring. However, the sliding friction member of the invention may be utilized for the sliding part of a zooming ring or the like.

FIGS. 7 through 10 are views similar to FIGS. 3 through 6 but in which the plastic member 3 has one side which is flocked. Since the plastic member 3 has one side flocked, namely, the side which is brought into contact with the outer wall of the inner cylinder 4, when the lens hood ring 1 is slid, the coated outer wall of the inner cylinder 4 will not be scratched by the sliding operation.

As is apparent from the above description, according to the invention, a simple construction is provided in which an elastic member such as a plastic member is merely fitted into the receiving groove of a sliding ring to thus provide an excellent sliding function and a suitable holding function while absorbing play. To assemble the plastic member into the sliding ring, unlike the conventional approach, it is unnecessary to use a step of gluing. In addition, the plastic member can be formed using existing machinery, and the material of the sliding friction member can be a known elastic material. Therefore, the manufacturing cost of the sliding friction member of the invention is much lower than that of the conventional member.

In addition, the use of the sliding friction member of the invention is effective in preventing the sliding part from being scratched when it is slid.

What is claimed is:

1. In a photographing lens device having first and second cylindrical member with said first cylindrical member being slidably fitted within said second cylindrical member for slidable movement with respect to said second cylindrical member through a sliding range, the improvement comprising: a sliding friction member provided between an outer surface of said first cylindrical member and an inner surface of said second cylindrical member for providing a sliding interface between said first and second cylindrical members substantially throughout said sliding range, said sliding friction member comprising a corrugated elastic member bent into an annular shape and fitted into a groove in said second cylindrical member.

2. The photographing lens device of claim 1, wherein said elastic member has a regular wavy shape.

3. The photographing lens device of claim 1, wherein said elastic member is flocked on a side thereof in contact with said outer surface of said first cylindrical member.

4. The photographing lens device of claim 2, wherein said elastic member is flocked on a side thereof in contact with said outer surface of said first cylindrical member.

5. The photographing lens device of claim 1, wherein said elastic member is flocked on a side thereof in contact with said outer surface of said first cylindrical member.

6. The photographing lens device of claim 1, wherein said sliding friction member is movable with said second cylindrical member.

7. In a photographing lens device having first and second cylindrical members with said first cylindrical member being slidably fitted within said second cylindrical member, the improvement comprising: a sliding friction member provided between an outer surface of said first cylindrical member and an inner surface of said second cylindrical member, said sliding friction member comprising a plate-shaped plastic member bent into an annular shape and fitted into a groove in said second cylindrical member, said elastic member having a plurality of protrusions formed therein at constant intervals.

8. In a photographing lens device having first and second cylindrical members with said first cylindrical member being slidably fitted within said second cylindrical member, the improvement comprising: a sliding friction member provided between an outer surface of said first cylindrical member and an inner surface of said second cylindrical member, said sliding friction member comprising a corrugated elastic member bent into an annular shape and fitted into a groove in said second cylindrical member, said elastic member being flocked on a side thereof in contact with said outer surface of said first cylindrical member.

* * * * *